(12) United States Patent
Hedberg (10) Patent No.: US 6,957,087 B1
(45) Date of Patent: Oct. 18, 2005

(54) POWER CONTROL IN MCPA EQUIPPED BASE STATIONS

(75) Inventor: Tomas Hedberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 884 days.

(21) Appl. No.: 09/691,174

(22) Filed: Oct. 19, 2000

(51) Int. Cl.[7] ................................................ H04Q 7/00
(52) U.S. Cl. ................................... 455/561; 455/127.2
(58) Field of Search ....................... 455/561, 69, 127.1, 455/126, 127.2, 522

(56) References Cited

U.S. PATENT DOCUMENTS

| | | | |
|---|---|---|---|
| 5,302,914 A | | 4/1994 | Arntz et al. |
| 5,384,547 A | | 1/1995 | Lynk, Jr. et al. |
| 5,852,770 A | * | 12/1998 | Kasamatsu .................. 455/126 |
| 6,038,432 A | * | 3/2000 | Onoda ..................... 455/127.2 |
| 6,223,056 B1 | * | 4/2001 | Appel ......................... 455/561 |
| 6,256,502 B1 | * | 7/2001 | Santa et al. .................. 455/442 |
| 6,269,255 B1 | * | 7/2001 | Waylett ..................... 455/562.1 |
| 6,411,825 B1 | * | 6/2002 | Csapo et al. ................. 455/561 |
| 6,711,388 B1 | * | 3/2004 | Neitiniemi ............... 455/127.1 |

FOREIGN PATENT DOCUMENTS

| | | |
|---|---|---|
| JP | 9139679 A | 5/1997 |
| WO | WO 96 27242 A | 9/1996 |
| WO | WO 00 07318 A | 2/2000 |
| WO | WO 01 60095 A | 8/2001 |

* cited by examiner

*Primary Examiner*—Nick Corsaro (57) ABSTRACT

A method and apparatus for controlling power in a Multiple Carrier Power Amplifier (MCPA) equipped base station in a wireless communication system. MCPA gain level is adjusted to maintain a linear transmit power, measured during an interval, and related information fed back across an interface to the base station. Two control parameters are provided from the base station to control gain measurement. The feedback includes defining a 100% load level associated with the MCPA and feeding back information proportional to the measured gain level. A plurality of base stations may be supported by one MCPA using several interfaces.

30 Claims, 4 Drawing Sheets

POWER CONTROL IN MCPA EQUIPPED BASE STATIONS

BACKGROUND

The present invention relates to power amplifiers for base stations in wireless communication systems and, in particular, to power amplifier control for Multiple Carrier Power Amplifiers (MCPA).

MCPAs presently account for more than half the equipment cost of a base station in a wireless communication system with the cost of a typical MCPA being directly proportional to maximum peak power provided thereby due to the corresponding increase in cost for higher capacity active components, cooling hardware, and the like. Base station costs thus can be correspondingly controlled by reducing or controlling the maximum peak power provided by an MCPA. However, degradation of performance beyond tolerable limits may occur when demands for peak power on traffic channels are at their greatest and exceed the maximum rating of the MCPA. Moreover specific functions which require nominal maximum power to be applied may be affected when MCPAs operate at reduced power levels.

When reducing peak power associated with MCPAs, often times, depending on algorithms used and peak traffic demand patterns, degradation may occur periodically and with differing levels of severity. According to a typical power dimensioning scheme, more carriers may be allocated to a base station than can typically be supported within peak power dimensions, for example, traffic maximums are achieved simultaneously on most or many channels. Presently, MCPA's may be dimensioned for "worst-case", i.e. full RF power on all carriers. It is thus desirable to dimension the MCPA closer to the average power. Several MCPA control schemes attempt to provided power levels closer to average power. In particular, U.S. Pat. No. 5,384,547 to C. N. Lynk, et al, describes a linear device for attenuating a signal if a power threshold is exceeded. Japanese Patent abstract JP 9139679 A describes a peak power reduction circuit which detects envelope power level for a multicarrier signal and attenuates a predetermined amount for a predetermined time if a threshold is exceeded. Such solutions, however, in themselves, pose additional problems in that if an MCPA is dimensioned close to average needed power, a large negative impact on service quality may be felt, since all channels are affected at overload. Present systems may further experience relatively moderate overall changes in output power, since the power is related only to the number of active carriers. It would be desirable for systems to adapt to more dynamic changes and a lower average/peak ratio due to, for example, dynamic BS power control per carrier or time slot, downlink Discontinuous transmission (DTX), or the like.

Some MCPAs may include autonomous power reduction devices. Overdrive of MCPA's with autonomous devices power reduction normally results in MCPA switch-off and activation of an alarm output. The alarm output may be fed to an alarm printer and, in the case of autonomous MCPA control, service quality may deteriorate to a large degree. Lower carrier power implies more unreliable coverage, slower access times, unreliable handoff.

It may further be desirable for large providers of wireless communications equipment to have independent suppliers of different components associated with such equipment. It is thus desired that MCPA's be capable of reductions in power independently of whether or not, for example, a particular base station is configured to handle such reductions. Independent power reduction capabilities may allow "optimal" power reduction from, for example, an operating cost standpoint, and "optimal" communication system behavior is achieved. Such performance may be achieved, for example, when operating parameters such as power level, are adapted to match all components within particular equipment such that for example the impact of a network service in overload situations is reduced or eliminated.

To effect power reduction, an MCPA and an associated base station may reduce power on carriers and channels associated with the base station. In a typical wireless system such as, for example, a system in accordance with the Global System for Mobile communications (GSM) system governed by the specification contained, for example, in "Digital cellular telecommunications system (Phase 2+); Radio transmission and reception (GSM 05.05 version 6.3.0 Release 1997). In a typical wireless communication system in accordance with, for example, the GSM specification, there are typically two kinds of channels: control channels and traffic channels. Control channels normally transmit at nominal, or maximum, power so that control signals responsible for new call setup can reach all the way to the cell border and within the cell. Accordingly, the power with which the control channel transmits establishes the cell radius. It is further important for the control channel to transmit with maximum power so that extended services such as, for example, SMS service, broadcast/paging services, and the like may be offered. It should be noted that because control channels are assumed to transmit at full power, functions such as, for example, "consistency check" and Locating are made possible. Should transmit power levels associated with the control channel vary, some degradation can be expected.

For traffic channels, transmit power may be set by a base station typically to a level inverse to the expected attenuation. For example, power may be set low when a mobile station (MS) is close to the BS and may be set at a level closer to maximum power when the MS approaches the cell border. Depending on the system different permutations of power management may occur based on location, as described, and based on timeslot. For example, TDMA Cellular PCS standard, ANSI/TIA/EIA-136, published Mar. 22, 1999, by TR-45.3 Committee, does not exclude per-timeslot downlink power regulation although power levels associated with different timeslots on a carrier may not be allowed to differ much. However, it should be noted that in accordance with ANSI/TIA/EIA-136, power may be temporarily set to a maximum level just before to just after a handoff.

In other systems, power level control may be implemented in TDMA based telecommunications systems in a more straightforward manner. In such systems transmit power associated with certain downlink bursts, particularly those which are being transmitted with more power than the corresponding mobile station requires, is adjusted during a given timeslot, and in such a way, that the transmit power adjustment resembles that of a typical fading event, in terms of time of occurrence and rate of occurrence, e.g., dB per msec. In so doing, other mobile stations, using the same frequency carrier or an adjacent frequency carrier, receiving a downlink burst during that timeslot at a power level that is marginally adequate, such as mobile stations operating at or near the border of nearby cells, are better able to cope with the effects of fading, since they are subjected to less interference. For further details, see for example, U.S. patent application Ser. No. 09/475,640 entitled "METHOD AND SYSTEM FOR MEASURING AND REPORTING RECEIVED SIGNAL STRENGTH" filed Dec. 30, 1999, and U.S. patent application Ser. No. 09/399,764 entitled "DOWNLINK TIMESLOT POWER CONTROL IN A TDMA SYSTEM" filed Sep. 21, 1999.

It would therefore be desirable to provide power control in MCPA equipped base stations which would reduce average power to the greatest extent possible while maintaining nominal power for critical functions and acceptable power levels for traffic channels.

SUMMARY

It is therefore an object of the present invention to provide a method and apparatus for power control in MCPA equipped base stations.

It is a further object of the present invention to provide an interface such that independently supplied base stations and MCPAs may be operated according to a power reduction control interface specification.

Therefore, in accordance with one embodiment of the present invention, the foregoing and other objects are achieved in a method and apparatus for controlling power in a wireless communication system having a base station and a Multiple Carrier Power Amplifier (MCPA) split into at least two separate units. By splitting the base station and MCPA, advantages may gained over systems where base station and MCPA are integrated. Accordingly the base station and the MCPA may be coupled with an interface. The interface may preferably be standardized for interchangeability. The base station may provide an aggregate signal representing one or more carrier signals associated with one or more mobile stations served by the base station across the interface from the base station to the MCPA. The MCPA may accordingly adjust its a gain level to maintain a linear transmit power level associated with the aggregate signal. During transmission, the MCPA may measure the gain level during an interval associated with, for example, an amount of time or a regularly occurring time interval using a sensor or suitable transmit power level or gain measuring device. Feed back information associated with the measured gain level may further be provided across the interface from the MCPA to the base station.

In accordance with another embodiment of the present invention, a first and second control parameter may be provided from the base station to the MCPA across the interface for controlling, for example, how power is measured and the interval for measurement and, thus, the measuring of the gain level may be thereby controlled.

In accordance with yet another embodiment of the present invention, the interface may be digital and the first and second parameters may include, for example, power averaging period and sampling interval. Accordingly, providing feedback may include defining a 100% load level associated with the MCPA and feeding back information across the interface from the MCPA to the base station which is proportional to the measured gain level. It may be preferable for the information to be linearly related to the measured gain level when the measured gain level is greater than or equal to the 100% load level, although a normal level may also be provided, e.g. information which reflects measured gain level throughout the entire range of values including above and below the 100% load level. With regard to the sampling interval, it is preferable that the sampling interval may corresponds to a synchronous interval such as a time slot interval in a TDMA system or an asynchronous interval such as an irregular interval as may be found in a slotless system such as a CDMA system or the like.

In accordance with yet another embodiment, the wireless communication system in accordance with the present invention may further include a plurality of base stations, the plurality of base station providing a plurality of aggregate signals to the MCPA. The plurality of aggregate signals may each represent one or more carrier signals associated with one more mobile stations served by each base stations. Accordingly the plurality of base stations and the MCPA may be split into a plurality of separate units to provide advantages over integrated units and, in addition it may be appreciated that it would be difficult for one MCPA to serve several base stations if base station and MCPA are integrated. The plurality of separate units may be coupled to the MCPA with a plurality of interfaces, although it will be appreciated that the interfaces should be consistent with each other for interchangeability. The plurality of aggregate signals may be provided across the plurality of interfaces and least one of a plurality of gain levels of the MCPA may be adjusted to maintain a linear output level. It should be noted that the plurality of gain levels may refer to gains associated with respective ones of the plurality of aggregate signals required such that a linear output level or consistent output gain level may be maintained. The plurality of gain levels may be measured during an interval using a sensor as described herein above and feed back information provided across the interface from the MCPA to the base station associated with the measured plurality of gain levels.

In one exemplary embodiment, the MCPA maintains a linear transmit power level by autonomously adjusting output power level on all active carriers by the same amount. Alternatively, the MCPA may maintain a linear transmit power level by maintaining a first power level associated with a control channel signal in the aggregate signal to preserve, for example, access capability particularly at cell boundaries. Power levels associated with remaining signals in the aggregate signal may be autonomously adjusted or alternatively, power levels associated with remaining signals in the aggregate signal can be prioritized by either the MCPA or the base station and power levels adjusted accordingly based on the prioritization. It may further be desirable to assign a higher priority to the remaining signals having relatively low power associated therewith.

BRIEF DESCRIPTION OF THE DRAWINGS

The objects and advantages of the invention will be understood by reading the following detailed description in conjunction with the drawings, in which.

DETAILED DESCRIPTION

Therefore, in accordance with the present invention a method and apparatus are provided for reducing and controlling power in a wireless communication system.

Figure 1A:
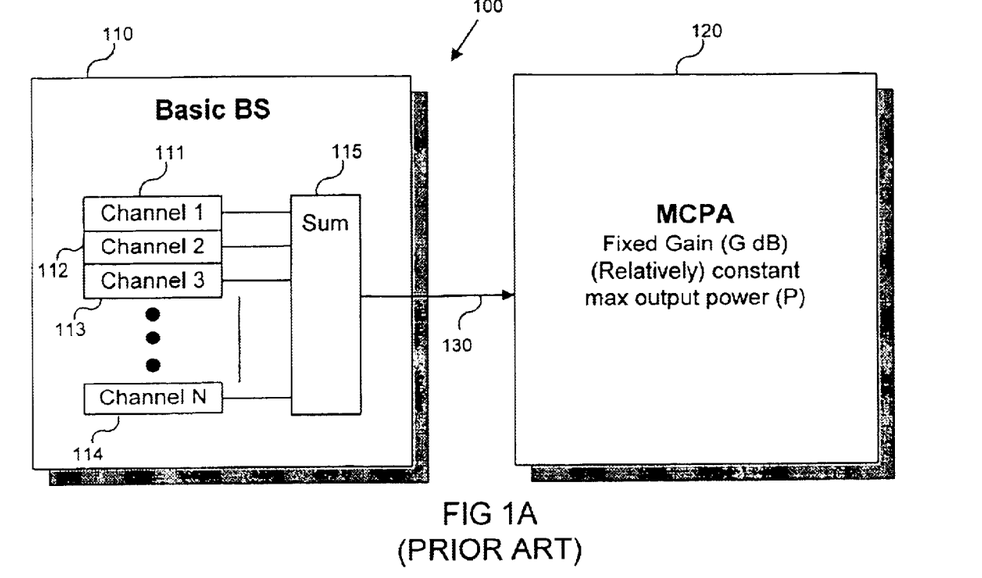
FIG. 1A is a diagram illustrating an exemplary prior art Fixed Gain MCPA.

An exemplary prior art fixed gain MCPA is illustrated in FIG. 1A where independent sections of system 100, including Base Station (BS) 110 and MCPA 120 are shown. BS 110 may process signal energy from, for example, channel 1 111, channel 2 112, channel 3 113, and up to N channels as in channel N 114, where N may represent the number of mobile stations which BS 110 is servicing. Signal energy from channel 1 111, channel 2 112, channel 3 113 and channel N 114 may be summed into composite signal 130 at summing block 115. In the present embodiment, MCPA 120 may apply a fixed gain to composite signal 130 prior to transmission over, for example, an air interface. It should be noted that fixed gain may be applied in accordance with the present invention as will be described herein below, however in a different manner and using information provided by the MCPA, for example, over an interface which is not available in the prior art.

In the present embodiment of system 100 in accordance with the present invention, BS 110 and MCPA 120 may be split and an interface provided therebetween. Splitting BS 110 and MCPA 120 accordingly provides advantages over more highly integrated base stations found in the prior art, particularly as better MCPA technology develops. An interface in accordance with the present invention would allow service providers to seek independent sources for MCPAs, and as new more efficient MCPAs are made available, installation could occur without requiring the simultaneous replacement of base station hardware as would be required in, for example, an integrated system. Moreover, as power control interface standards evolve, placing more intelligence at the base station, new base station technology could be installed for interfacing with existing MCPAs or, for example, additional base stations may be added to a single MCPA.

Figure 1B:
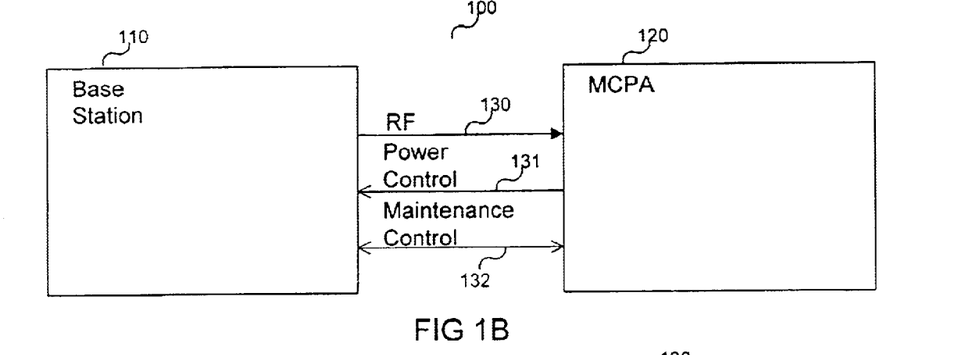
FIG. 1B is a diagram illustrating an exemplary embodiment of an interface between an MCPA and a Base Station in accordance with the present invention.

In another exemplary embodiment of system 100, as illustrated in FIG. 1B, BS 110 and MCPA 120, are shown with an interface provided therebetween which includes feedback information. Composite signal 130 may be input into MCPA 120 as previously described. However, power control signal 131 in the present embodiment may be input from MCPA 120 to BS 110 to provide feedback information useful for, for example, optimizing the use of available RF power by MCPA 120. System 100 may also be provided with a maintenance control interface between BS 110 and MCPA 120 using maintenance control signal 132. Maintenance control signal 132 may include supervisory and maintenance related signals for conducting, for example, system testing, and the like. Thus, a standardized interface may be provided such that MCPAs and base stations may communicate information related to power control. Accordingly, MCPA 120 and Base Station BST 210 may be manufactured independently and optimal system behavior of system 200 may nonetheless be achieved through compliance with an interface in accordance with the present invention.

Figure 1C:
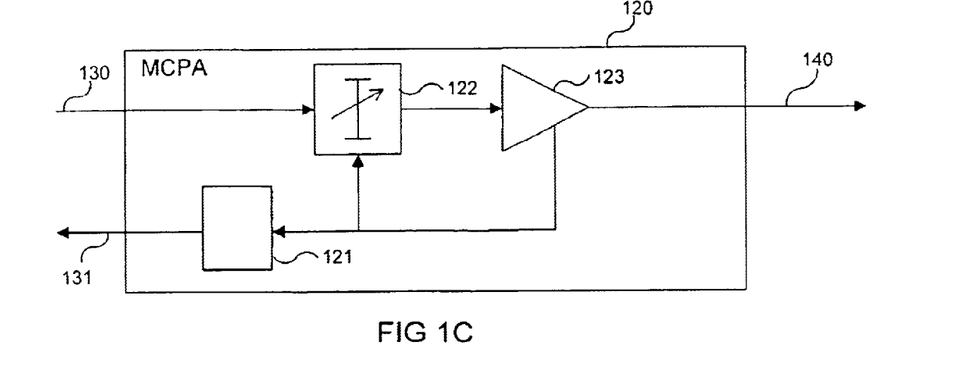
FIG. 1C is a diagram illustrating an exemplary autonomous MCPA embodiment in accordance with the present invention.

It may further be desirable for MCPA 120 to be provided with the capability for autonomous detection of overload and autonomous detection of gain to be described in more detail hereinafter, so that overload situations may be dealt with when, for example, BS 110 does not support power reduction. MCPA 120 therefore, in accordance with the present embodiment, may be illustrated in more detail in FIG. 1C. It can be seen that composite signal 130 may be input to variable attenuator 122 which may then be fed to amplifier 123 where output signal 140 may be generated for transmission over, for example, an air interface. Power control output 131 can be generated in power control feedback block 121 and may correspond preferably linearly to the attennuation applied at variable attennuator 122. Accordingly, BS 110 may be able to determine how much total output power should be reduced, or alternatively, how to manage additional load levels after a maximum load level has been reached as may best be illustrated in FIGS. 2A and 2B.

Figure 2A:
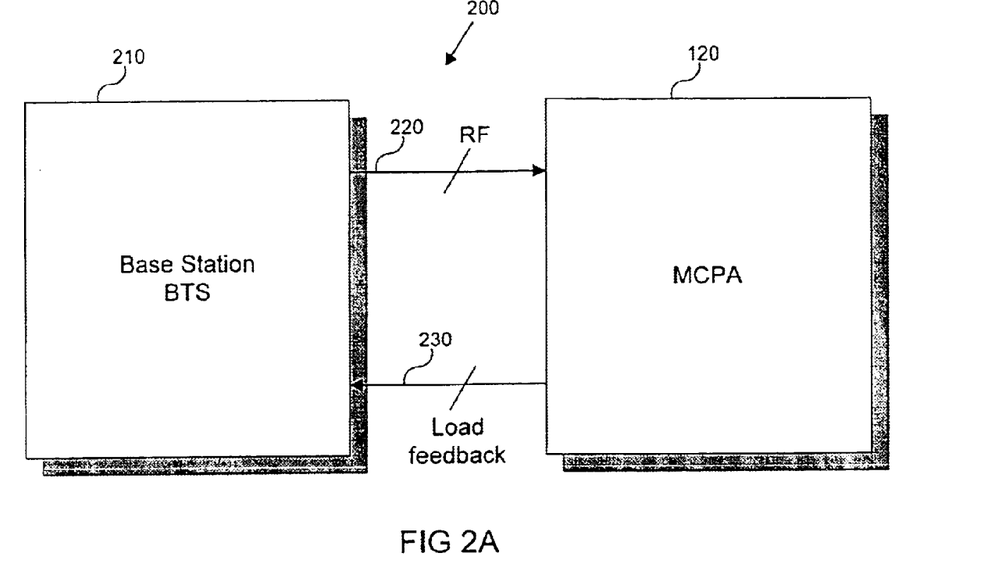
FIG. 2A is a diagram illustrating an exemplary digital interface between a Base Station Transceiver and a MCPA in accordance with the present invention.
Figure 2B:
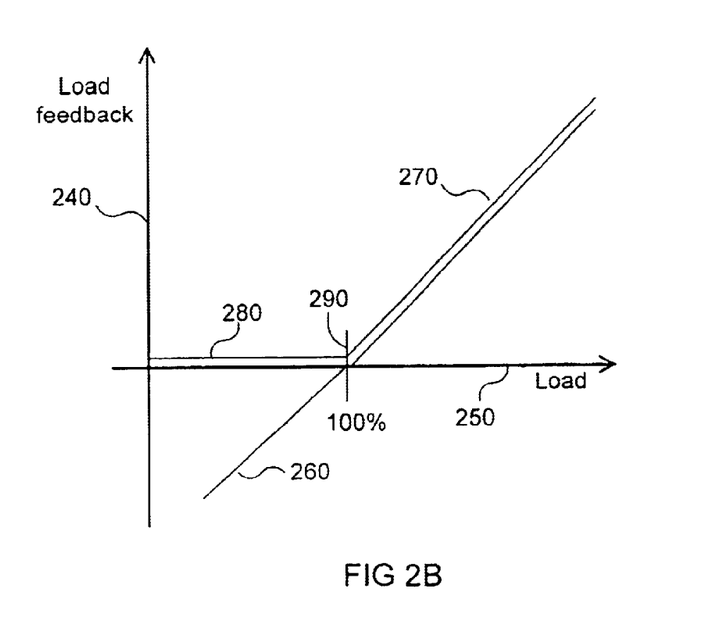
FIG. 2B is a graph illustrating an exemplary percent load curve as a function of exemplary load feed-back in accordance with the present invention.

Base Station Transceiver (BTS) 210 may receive load feedback information 230 which may preferably be a digital signal or digital data representing, for example, peak output power per sampling interval or the like. It should be appreciated by those skilled in the art that while load feedback signal 230 is described as a digital data signal, it could also be embodied, for example, as an analog signal, a digital level from, for example, an A/D converter, or a digital information signal transmitted either on a signal serial digital interface line or on a parallel data bus. Thus, in accordance with the present embodiment, MCPA 120 may act autonomously to reduce the gain of the aggregated RF signal 220 to keep output levels within the linear range as may be seen in FIG. 2B, e.g. within specified carrier-to-distortion levels.

Accordingly, MCPA 120 may provide load feedback signal 230 representing a linear measure of an overload factor, or digital approximation thereof, back to Base Station BST 210. Load feedback signal 230 may be either a normal linear feedback signal with 100% full load level defined as in FIG. 2B at 290, or may output a zero level as in FIG. 2B at 280 up to a 100% load level at, for example, 290 wherein load feedback signal 230 may provide an increased value linearly at higher levels proportional to the amount of load as in FIG. 2B at 270.

Figure 3:
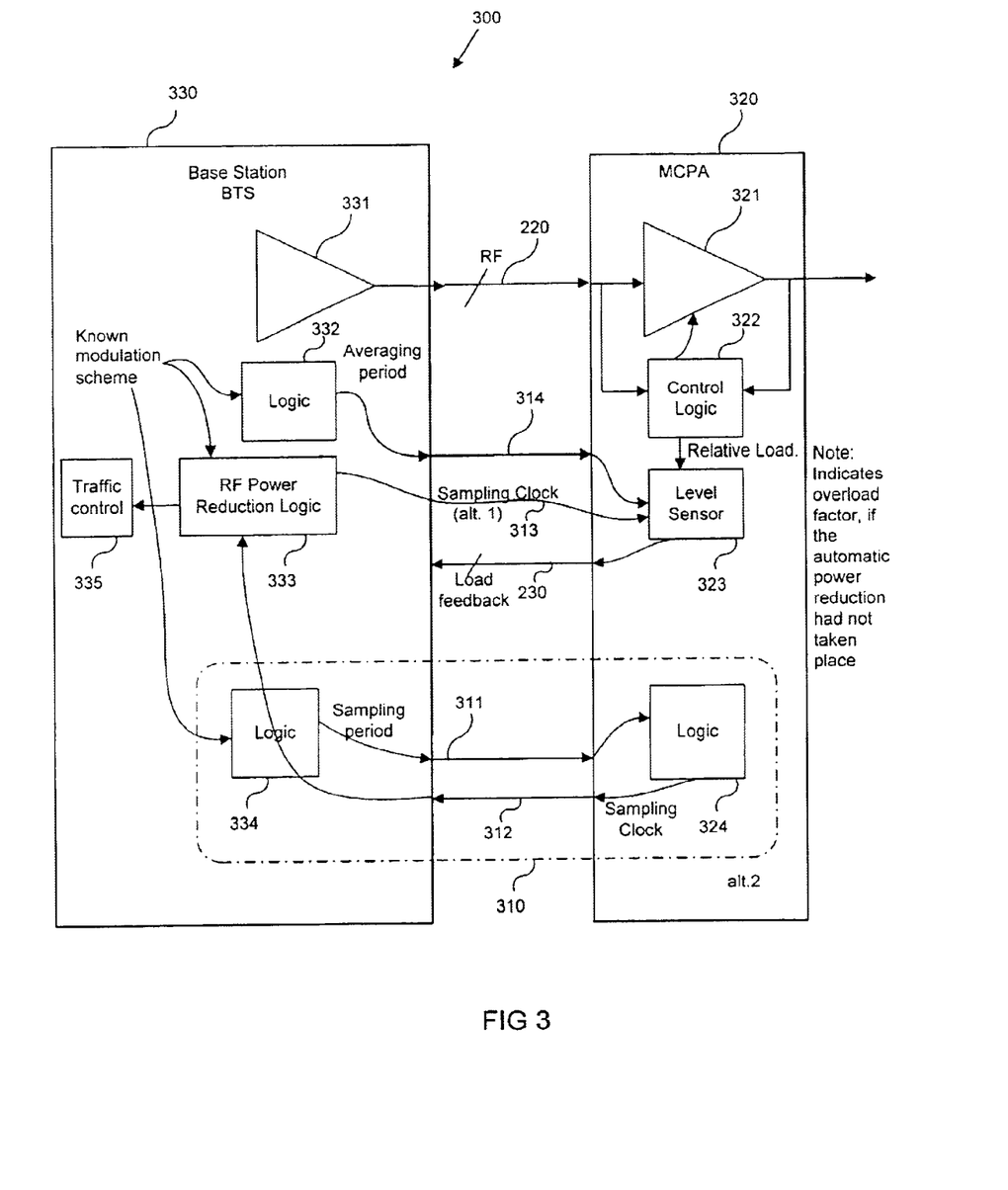
FIG. 3 is a diagram illustrating portions of an exemplary BTS and exemplary MCPA in accordance with the exemplary digital interface embodiment illustrated in FIG. 2A.

A better understanding of an exemplary interface in accordance with the present invention may be gained by reference to a more detailed illustration of an exemplary digital interface embodiment as in FIG. 3. In one embodiment, MCPA 320 may be provided with, for example, amplifier 321, control logic 322, and level sensor 323 for controlling and providing feedback information to BTS 330. Level sensor 323, for example, may provide a digital information signal proportional to, for example, the peak output power relative to a 100% load level each averaging period. The value, for example, may be sent as load feedback signal 230, every sampling interval. MCPA 320 may send samples autonomously where a clock signal is provided from MCPA 320 to BTS 330, or may be sent in response to a clock received from BTS 330 which further inherently establishes a sampling interval. Such an embodiment may be shown for example with BTS 330 sending sampling period signal 311 to MCPA 320 to establish the sampling interval; and MCPA 320 sending clock signal 312 back to BTS 330 to provide information as to when samples are available.

In one embodiment, sampling clock signal 313 and averaging period signal 314 may preferably be provided by BTS 330 since preferred sampling intervals are generally known by BTS 330, for example, at the end of a time slot in a TDMA system where each time slot may have a unique RF transmit power. Preferred sampling intervals may further be associated with measurement, for example, at level sensor 323. In one embodiment, measurement, e.g. sampling, may be performed at an optimum point in a time slot. For example, if power is constant over a time slot, sampling should be performed preferably at the end of the measurement period when the greatest amount of data related to power levels has been collected by, for example, level sensor 323. Alternatively, the sampling interval may be set for a duration which is suitable to achieve accuracy while providing adequate correlation of feedback information to the controlled intervals e.g. time slots. Such a sampling interval would preferably be around one time slot such that, for example, RF Power Control logic 333 will know exactly which time slot caused an overload, thus improving the accuracy of the power reduction algorithm.

In yet another embodiment, BTS 330 may send sampling clock signal 313 at irregular time intervals. Such irregular sampling may be suited for, for example, hybrid systems, or systems that do not use time slot synchronized carriers. An example of a hybrid system may be a base station which supports ANSI/TIA/EIA-136, supra, and future revised and/or related standards such as, for example, enhanced GPRS (EGPRS). Irregular sampling may further be useful on CDMA systems where there is no practical stable clocking period. It would further be useful to allow several BTS 330 which are designed to different specifications to be connected to a single MCPA 320. For example, all, or some combination of an ANSI/TIA/EIA-136 compatible, EGPRS compatible, and a CDMA compatible BTS 330 could be coupled to MCPA 320 by means of an interface in accordance with the present invention for optimal power control being possible for all BTS 330s so coupled.

Traffic control block 335 and RF Power Reduction Logic 333 in BTS 330 may use algorithms which are aimed at limiting peak output power. If the peak output power from MCPA 320 at any instant would be larger than the limit, MCPA 320 would loose linearity and therefore violate the spectrum mask specificied, for example, by the GSM specification, supra. Therefore, it is important for BTS 330 to ensure that power does not exceed limitations.

One important consideration in increasing the efficient use of power from MCPA 320 is to allocate more users to BTS 330 than what can be supported within the peak power limit by assuming that the Power Control algorithms used, for example, in RF Power Reduction Logic 333 and Traffic Control logic 335 will manage to keep the peak power within the limitation. When these assumptions fail, as they will for example during peak traffic times on all channels, output power must be manipulated for some users.

One algorithm for handling such situations works on a measurement report period basis. Since it is not possible to predict the fast changes coming from, for example, Discontinuous Transmission mode, (DTX), such changes can not be taken into account when setting the power to each communication link. Accordingly, a Power Control algorithm operating at a slower rate may be useful.

Whenever the requested peak power is above the limit of MCPA 320 requested power from one or several users must be denied and transmission must be conducted with a lower power. Such a reduction in power from what is requested will generally result in a reduction of the quality for the specific user.

Figure 4:
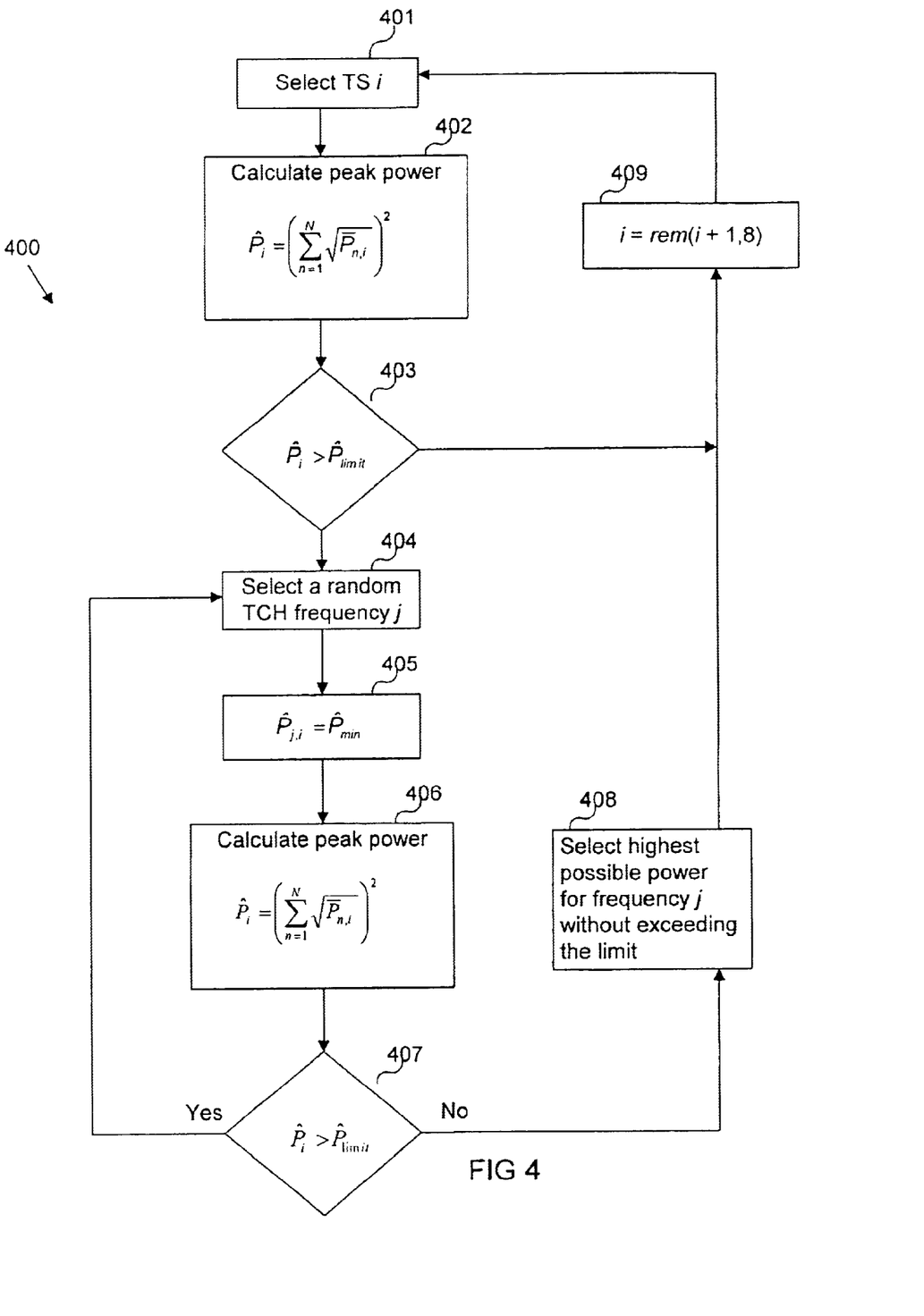
FIG. 4 is a flowchart illustrating an exemplary power limitation algorithm which may be used for the power control in accordance with the present invention.

FIG. 4 is a flow chart illustrating an exemplary power limitation algorithm which may be used for power control in accordance with the present invention. A time slot is selected for consideration in step 401. When the requested average output power for a certain time slot has been calculated for the next measurement report period, the possible peak power of MCPA 320 may be calculated in step 402 and is compared with the limitation of MCPA 320 in step 403. If the possible peak power is larger than the limit, a random TCH frequency may be selected in step 404 and power for that slot changed in step 405 so that the limitation is met. At this point, peak power is calculated again in step 406, and if setting the average output power of the selected frequency to the minimum is not enough as in step 405, another TCH carrier may be selected and power changed for that frequency as well. When the peak power of the time slot can be met we can set the power of the latest changed frequency to the maximum power that can meet the limitation of MCPA 320.

It should be noted that when calculating the possible peak power for the next iteration frequency hopping may be taken into account. The worst case is when the user with the lowest output power is to transmit on the BCCH carrier. We have to dimension the MCPA to be able to handle that, even when there is an idle channel on the BCCH carrier, which will produce dummy bursts.

It should be understood that while an exemplary power reduction algorithm has been described herein, other methods exist. For example methods exist for reducing the power for all the users or reducing the power for the user that is using the highest power. Regardless of the power reduction method used, BTS 330 may be assumed to have knowledge about the maximum output power from MCPA 320. BTS 330 however may not know the capacity of MCPA 320 if, for example, MCPA 320 comes from a different vendor. The capacity might also vary with temperature and power supply conditions. For example, at a power failure when BTS 330 will be operated on batteries or in countries with unstable current, MCPA 320 capacity may vary. It should further be evident to one skilled in the art that near real-time load information transferred, for example, from MCPA 320 to BTS 330 in accordance with the exemplary embodiments of the present invention, may be input to power limitation algorithms, as described previously herein, for more accurate performance.

It will be appreciated by those skilled in the art that the present invention may be embodied in other specific forms without departing from the spirit or essential character thereof. For example, while the present invention may typically be associated with GSM, TDMA and CDMA systems, the teachings in accordance with the present invention may be applied in other technologies as well. The presently disclosed embodiments are therefore considered in all respects to be illustrative and not restrictive. The scope of the invention is indicated by the appended claims rather than the foregoing description and all changes that come within the meaning and range of equivalents thereof are indicated to be embraced therein.

What is claimed is:

1. A method for controlling power in a wireless communication system having a base station and a Multiple Carrier Power Amplifier (MCPA) split into at least two separate units, the method comprising the steps of:

coupling the at least two separate units with an interface;

providing an aggregate signal representing one or more carrier signals across the interface from the base station to the MCPA;

measuring a gain level during an interval;

providing a first and second control parameter from the base station to the MCPA across the interface;

controlling the measuring of the gain level using the first and second parameters; and feeding back information across the interface from the MCPA to the base station associated with the measured gain level.

2. The method of claim 1, further comprising the step of:
adjusting the gain level of the MCPA to maintain a linear transmit power level associated with the aggregate signal.

3. The method of claim 1, wherein the interface is digital and wherein the first and second parameters are power averaging period and sampling interval.

4. The method of claim 1, wherein the interface is digital and wherein the step of feeding back information further includes the step of:
defining a 100% load level associated with the MCPA;
feeding back information across the interface from the MCPA to the base station proportional to the measured gain level, wherein the information is linearly related to the measured gain level when the measured gain level is greater than or equal to the 100% load level.

5. The method of claim 1, wherein the interval corresponds to a synchronous interval.

6. The method of claim 1, wherein the interval corresponds to an asynchronous interval.

7. The method of claim 1, wherein the interval corresponds to a time slot interval.

8. The method of claim 1, wherein the wireless communication system further includes a plurality of base stations, the plurality of base station providing a plurality of aggregate signals to the MCPA, the plurality of aggregate signals each representing one or more carrier signals associated with one or more mobile stations served by each of the plurality of base stations, and wherein the method further comprises the steps of:
splitting the plurality of base stations and the MCPA into a plurality of separate units;
coupling the plurality of separate units with a plurality of interfaces;
providing the plurality of aggregate signals across the plurality of interfaces;
measuring a gain level associated with the plurality of aggregate signals; and
feeding back information across the interface from the MCPA to the base station associated with the measured gain level.

9. The method of claim 2, wherein the step of adjusting the gain level of the MCPA further includes the steps of:
maintaining a first power level associated with a control channel signal in the aggregate signal; and
autonomously adjusting one or more second power levels associated with remaining signals in the aggregate signal.

10. The method of claim 2, wherein the step of adjusting the gain level of the MCPA further includes the steps of:
maintaining a first power level associated with a control channel signal in the aggregate signal;
prioritizing one or more second power levels associated with remaining signals in the aggregate signal; and
adjusting the one or more second power levels based on the prioritization.

11. The method of claim 10, wherein the step of prioritizing further includes assigning a higher priority to the remaining signals having relatively low power associated therewith.

12. The method of claim 1, wherein the step of adjusting the gain level of the MCPA to maintain a linear transmit power level associated with the aggregate signal further includes the steps of:
maintaining a first power level associated with a control channel signal in the aggregate signal;
receiving a priority over the interface from the base station to the MCPA, the priority associated with one or more second power levels associated with remaining signals in the aggregate signal; and
adjusting the one or more second power levels based on the prioritization.

13. The method of claim 8, further comprising the steps of:
adjusting the gain levels of the MCPA to maintain a linear output level associated with the plurality of aggregate signals; and
measuring the gain level during an interval.

14. The method of claim 2, wherein the step of adjusting the gain level of the MCPA further includes the steps of:
maintaining a first power level associated with a control channel signal in the aggregate signal; and
adjusting one or more second power levels associated with remaining signals in the aggregate signal in the base station.

15. The method of claim 2, wherein the step of adjusting the gain level of the MCPA further includes the steps of:
maintaining a first power level associated with a control channel signal in the aggregate signal;
prioritizing one or more second power levels associated with remaining signals in the aggregate signal in the base stations; and
adjusting the one or more second power levels in the base station based on the prioritization.

16. An apparatus for controlling power in a wireless communication system, the apparatus comprising:
an interface;
a base station; and
a Multiple Carrier Power Amplifier (MCPA), the base station and the MCPA being split into at least two separate units coupled through the interface, the MCPA configured to:
receive an aggregate signal across the interface from the base station to the MCPA, the aggregate signal representing one or more carrier signals;
measure a gain level during an interval;
receive a first and second control parameter from the base station across the interface responsive to the measured gain level;
control the measuring of the gain level using the first and second parameters; and
feed back information across the interface from the MCPA to the base station associated with the measured gain level.

17. The apparatus of claim 16, wherein the MCPA is further configured to:
adjust the gain level to maintain a linear transmit power level associated with the aggregate signal.

18. The apparatus of claim 16, wherein the wherein the interface is digital and wherein the first and second parameters are power averaging period and sampling interval.

19. The apparatus of claim 16, wherein the interface is digital and wherein the MCPA, in feeding back information, is further configured to:
define a 100% load level;
feed back information across the interface from the MCPA to the base station proportional to the measured gain level, wherein the information is linearly related to the measured gain level when the measured gain level is greater than or equal to the 100% load level.

20. The apparatus of claim 16, wherein the interval corresponds to a synchronous interval.

21. The apparatus of claim 16, wherein the interval corresponds to an asynchronous interval.

22. The apparatus of claim 16, wherein the interval corresponds to a time slot interval.

23. The apparatus of claim 16, further comprising:
a plurality of base stations;
wherein the plurality of base stations and the MCPA being split into a plurality of separate units coupled through the interface, the MCPA further configured to:
receive a plurality of aggregate signals across the interface from the plurality of base stations to the MCPA, each of the plurality of aggregate signals representing one or more carrier signals;
measure a gain level associated with the plurality of aggregate signals; and
feed back information across the interface from the MCPA to the base station associated with the measured gain level.

24. The apparatus of claim 17, wherein the MCPA, in adjusting the gain level maintain the linear transmit power level associated with the aggregate signal is further configured to:
maintain a first power level associated with a control channel signal in the aggregate signal; and
autonomously adjust one or more second power levels associated with remaining signals in the aggregate signal.

25. The apparatus of claim 17, wherein the MCPA, in adjusting the gain level maintain the linear transmit power level associated with the aggregate signal is further configured to:
maintain a first power level associated with a control channel signal in the aggregate signal;
prioritize one or more second power levels associated with remaining signals in the aggregate signal; and
adjust the one or more second power levels based on the prioritization.

26. The apparatus of claim 25, wherein the MCPA, in prioritizing, is further configured to:
assign a higher priority to the remaining signals having relatively low power associated therewith.

27. The apparatus of claim 17, wherein the MCPA, in adjusting the gain level maintain the linear transmit power level associated with the aggregate signal is further configured to:
maintain a first power level associated with a control channel signal in the aggregate signal;
receive a priority over the interface from the base station, the priority associated with one or more second power levels associated with remaining signals in the aggregate signal; and
adjust the one or more second power levels based on the prioritization.

28. The apparatus of claim 23, wherein the MCPA is further configured to:
adjust at least one of a plurality of gain levels to maintain a linear transmit power level associated with the plurality of aggregate signals; and
measure the plurality of gain levels during an interval.

29. The apparatus of claim 17, wherein the MCPA, in adjusting the gain level maintain the linear transmit power level associated with the aggregate signal is further configured to:
maintain a first power level associated with a control channel signal in the aggregate signal; and
autonomously adjust one or more second power levels associated with remaining signals in the aggregate signal in the base station.

30. The apparatus of claim 17, wherein the MCPA, in adjusting the gain level maintain the linear transmit power level associated with the aggregate signal is further configured to:
maintain a first power level associated with a control channel signal in the aggregate signal;
prioritize one or more second power levels associated with remaining signals in the aggregate signal in the base station; and
adjust the one or more second power levels based on the prioritization in the base station.

* * * * *